(12) United States Patent
Neumann et al.

(10) Patent No.: US 6,431,481 B1
(45) Date of Patent: Aug. 13, 2002

(54) SYSTEMS, METHODS AND APPARATUS FOR WINDING CONDUCTIVE WIRES FOR A STATOR OF AN ELECTRIC MOTOR

(75) Inventors: Jeffrey D. Neumann, Evansville; David L. Bailey, Yoder, both of IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/127,749

(22) Filed: Aug. 3, 1998

Related U.S. Application Data

(60) Provisional application No. 60/057,061, filed on Aug. 29, 1997.

(51) Int. Cl.[7] .................. B65H 59/12; B65H 23/16; B65H 23/18; B65H 23/188; B65H 77/00
(52) U.S. Cl. .................. 242/154; 242/153; 242/155 M; 242/417.2; 242/419.6; 242/419.7; 242/419.9
(58) Field of Search .................. 242/154, 153, 242/419.9, 419.6, 419.7, 417.2, 155 M

(56) References Cited

U.S. PATENT DOCUMENTS

| | | | | |
|---|---|---|---|---|
| 2,661,914 A | * | 12/1953 | Thom | 242/419.9 X |
| 2,685,417 A | | 8/1954 | Bartelson | |
| 2,703,218 A | * | 3/1955 | Haskell et al. | 242/419.9 X |
| 2,854,197 A | | 9/1958 | MacNeill | |
| 3,169,420 A | | 2/1965 | Stone et al. | |
| 3,331,568 A | * | 7/1967 | Okamura | 242/154 |
| 3,346,019 A | | 10/1967 | Brosseit et al. | |
| 3,495,790 A | | 2/1970 | Fisnar | |
| 3,567,148 A | | 3/1971 | Ottavan | |
| 3,912,191 A | | 10/1975 | Anderson et al. | |
| 4,015,102 A | * | 3/1977 | Zadorozny | 242/154 X |
| 4,062,502 A | * | 12/1977 | Peck, Jr. | 242/411 |
| 4,322,039 A | | 3/1982 | Stevens | |
| 4,343,443 A | * | 8/1982 | Grounds | 242/419.9 |
| 4,447,016 A | * | 5/1984 | Enberg et al. | 242/419.9 X |
| 4,880,173 A | * | 11/1989 | Lachey | 242/419.6 X |
| 5,080,295 A | * | 1/1992 | Hongo et al. | 242/419.9 |
| 5,092,534 A | * | 3/1992 | Tanaka | 242/155 M |
| 5,342,000 A | * | 8/1994 | Berges et al. | 242/155 M |
| 5,499,772 A | * | 3/1996 | Maeda et al. | 242/154 X |
| 5,520,351 A | | 5/1996 | Prospero et al. | |
| 5,664,735 A | * | 9/1997 | Sbalchiero et al. | 242/155 M X |

FOREIGN PATENT DOCUMENTS

| | | | | |
|---|---|---|---|---|
| CH | 24304 | * | 8/1901 | 242/153 |
| DE | 0474912 A1 | | 3/1992 | |
| IT | 0703658 A1 | | 3/1996 | |

OTHER PUBLICATIONS

Patent Cooperation Treaty, International Search Report, PCT/US 98/17139, Dec. 12, 1998, 3 pgs.

* cited by examiner

Primary Examiner—Michael R. Mansen
Assistant Examiner—Minh-Chau Pham
(74) Attorney, Agent, or Firm—Karl Vick, Esq.; Damian Wasserbauer, Esq.; Armstrong Teasdale LLP

(57) ABSTRACT

Systems, methods and apparatus for winding conductive wires for a stator of an electric motor. In one embodiment, a hysteretic tensioning apparatus is utilizing to substantially stabilize tension in a conductive wire supplied to a winding machine. The hysteretic tensioning apparatus includes a support member, a brake member, and four idler arms. The brake member is rotatably mounted to the brake member and configured to engage the conductive wire. The idler arms each are spring mounted to the support member and also are configured to engage the conductive wire. The conductive wire is extended across the support member so that it extends between adjacent idler arms and the brake and is inserted into the winding machine.

16 Claims, 2 Drawing Sheets

SYSTEMS, METHODS AND APPARATUS FOR WINDING CONDUCTIVE WIRES FOR A STATOR OF AN ELECTRIC MOTOR

CROSS REFERENCE TO RELATED APPLICATION

This application claims the benefit of U.S. Provisional Application No. 60/057,061, filed Aug. 29, 1997.

FIELD OF THE INVENTION

This invention relates generally to stators for dynamoelectric machines and, more particularly, to methods and apparatus for winding conductive wires for such stators.

BACKGROUND OF THE INVENTION

The stator of a dynamoelectric machine such as an electric motor or generator typically includes a core of magnetic material having an axially extending bore for receiving a rotor. The core typically is formed from a plurality of identical laminations which are aligned and arranged in a stack held together by clips. Each lamination includes a plurality of teeth which extend radially into the bore. Slots between each of the teeth extend radially outwardly from the bore. The ends of the teeth and the open ends of the slots define the periphery of the bore.

A plurality of coils formed from insulated conductive wire are inserted into selected core slots with portions of the coils at the ends of the core forming end turn regions. The coils are interconnected to form coil groups or poles. The conductive wires which form the coils, sometimes referred to as stator windings, typically are coated with a varnish or an enamel so that a tough protective coating is formed around each wire. The coating is required so that each wire is well insulated from the other wires.

A single speed motor typically includes coil groups which establish at least one main winding and an auxiliary or start winding. The coil groups are formed with a winding machine and located on coil insertion (or injection) tooling. The coil groups are then injected into the stator, e.g., moved from the coil insertion tooling to the stator, so that coil portions substantially aligned with stator core slots are injected into such slots.

To form each coil, conductive wire is inserted into the winding machine and coupled to a winding machine needle. The winding machine needle then extracts the conductive wire so that the extracted wire is coiled. The tension of the conductive wire typically fluctuates while coiling the wire. Particularly, each time the winding needle changes direction to form the coil, some slack occurs in the conductive wire. This fluctuating tension sometimes causes the conductive wire to break. In addition, this fluctuating tension sometimes results in loose windings being injected into the stator, which is undesirable.

It would be desirable to provide an apparatus for reducing tension fluctuation while coiling conductive wires. It also would be desirable for such apparatus to be simple to fabricate and utilize.

SUMMARY OF THE INVENTION

These and other objects may be attained by a hysteretic tensioning apparatus which, in one form, substantially stabilizes tension in conductive wires supplied to a winding machine. The hysteretic tensioning apparatus includes a support member, a brake member, and at least one idler arm. The brake member is rotatably mounted to the support member adjacent a first side thereof and is rotatable relative to the support member. The idler arm is spring mounted to the support member adjacent a second side thereof and also is configured to engage. the conductive wire.

The hysteretic tensioning apparatus is positioned so that the conductive wire moves through the apparatus during a winding operation. Particularly, the conductive wire enters the hysteretic tensioning apparatus and extends between the brake member and the idler arm. The wire then exits the hysteretic tensioning apparatus and is supplied to the winding machine. The brake member and idler arm cooperate to substantially alleviate any slack from occurring from reversing direction of the winding needle, and thus substantially prevent loose windings on the stator and wire breakage during the winding operation.

The above described hysteretic tensioning apparatus reduces tension fluctuation in a conductive wire while coiling the conductive wire. Such apparatus also is believed to be simple to fabricate and utilize.

DETAILED DESCRIPTION

Figure 1:
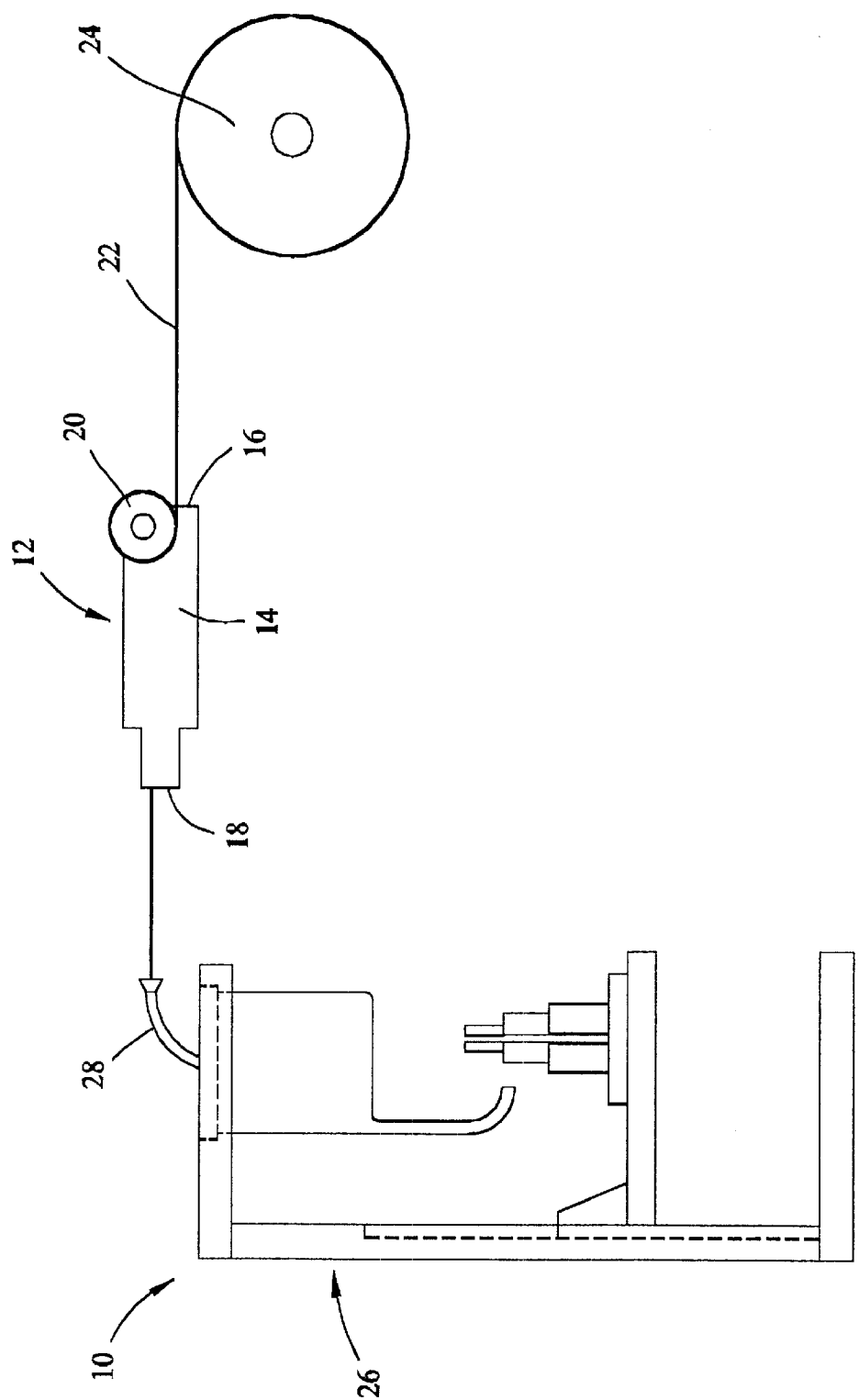
FIG. 1 is a schematic illustration of a winding system assembly including a hysteretic tensioning apparatus in accordance with one embodiment of the present invention.

FIG. 1 is a schematic illustration of a winding system assembly 10 including a hysteretic tensioning apparatus 12 in accordance with one embodiment of the present invention. Hysteretic tensioning apparatus 12 includes a support member 14 having a first end 16 and a second end 18. A brake member 20 is rotatably mounted to support member 14 adjacent first end 16 and brake member 20 is configured to engage a conductive wire 22. Brake member 20 may, for example, be a rotatable disk, and is a current controlled brake member in that a current supply source (not shown in FIG. 1) is communicatively coupled to brake member 20. The current supply source supplies current to brake member to enable brake member 20 to apply a substantially constant tension to conductive wire 22 during a winding operation.

Winding system assembly 10 further includes a wire source 24 and a winding machine 26 having a winding needle 28. Wire source 24 may, for example, be a spool having conductive wire 22 coupled thereto, and winding machine 26 is configured to receive conductive wire 22 from wire source 24. Particularly, winding machine 26 is configured to pull conductive wire 22 from wire source 24 and to coil such wire 22 for injection into a stator (not shown). Winding machines and wire sources are known. Hysteretic tensioning apparatus 12 is positioned between wire source 24 and winding machine 26, and conductive wire 22 passes through hysteretic tensioning apparatus 12 during the winding operation.

Figure 2:
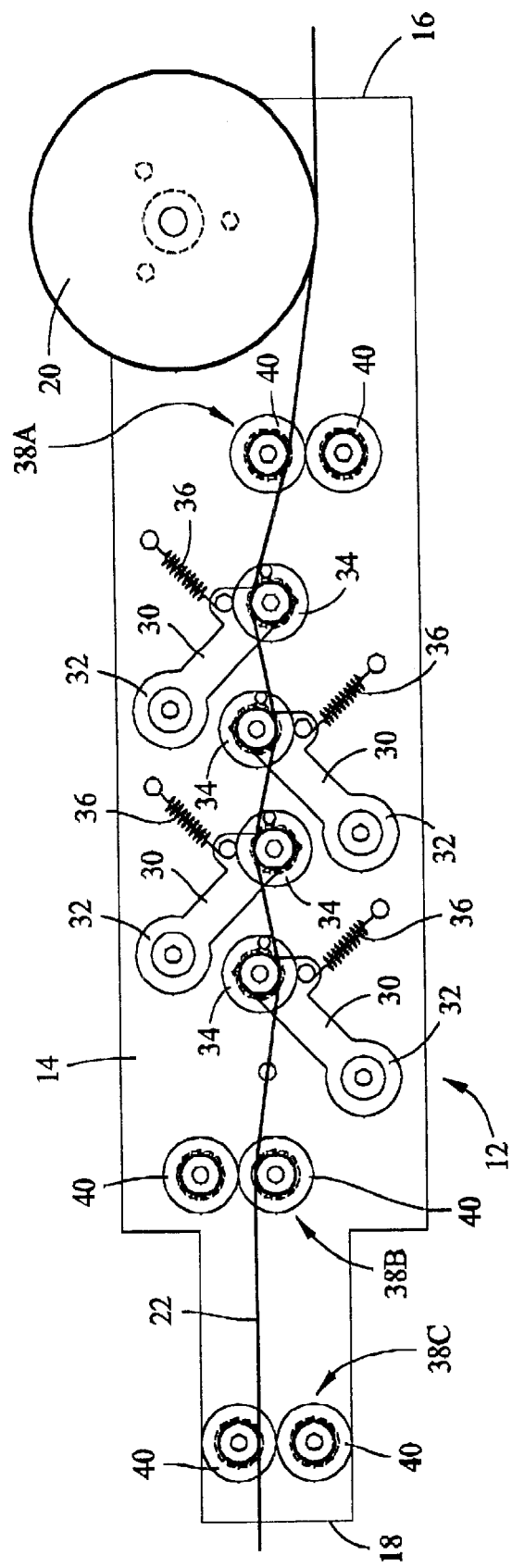
FIG. 2 is a schematic illustration of the hysteretic tensioning apparatus shown in FIG. 1.

Referring now to FIG. 2, hysteretic tensioning apparatus 12 includes four idler arms 30 mounted to support member 14 and configured to engage conductive wire 22. Each idler arm 30 includes a first end 32 pivotally coupled to support member 14 and a second end 34 configured to engage conductive wire 22. Each idler arm 30 is a spring loaded idler arm in that springs 36 (four springs 36 are shown in FIG. 2) are coupled to and between support member 14 and respective idler arms 30 so that idler arms 30 are spring biased to move relative to support member 14 and pivot about their respective first ends 32.

Hysteretic tensioning apparatus 12 also includes first, second and third guidance members 38A, 38B and 38C, respectively, coupled to support member 14. First guidance member 38A is positioned adjacent first end 16 of support member 14 between brake member 20 and idler arms 30. Second guidance member 38B is positioned adjacent second end 18 of support member so that idler arms 30 are between first guidance member 38A and second guidance member 38B. Third guidance member 38C is positioned so that second guidance member 38B is located between first guidance member 38A and third guidance member 38C. Each guidance member 38A, 38B, and 38C includes two rotating members configured to engage conductive wire 22 therebetween. Conductive wire 22 extends between rotating members 40 of each guidance member 38A, 38B and 38C, respectively, and engages brake member 20 and idler arms 30.

Hysteretic tensioning apparatus 12 is positioned so that conductive wire 22 moves through apparatus 12 during the winding operation. Particularly, wire source 24 supplies conductive wire 22 to hysteretic tensioning apparatus 12, and conductive wire 22 extends between brake member 20 and idler arms 30, exits apparatus 12 and is supplied to winding machine 26, which winds conductive wire 22 to form a coil suitable for injection into the stator. As conductive wire 22 passes through apparatus 12, brake member 20 and idler arms 30 engage conductive wire 22 and cooperate to ensure that a tension on conductive wire 22 extending between hysteretic tensioning apparatus 12 and winding machine 26 is substantially uniform. Particularly, the current supply source supplies current to brake member 20 so that brake member 20 applies a substantially constant tension to conductive wire 22 during the winding operation. The spring loaded idler arms 30 engage conductive wire 22 and cooperate to substantially alleviate any slack from occurring in conductive wire 22 which might otherwise be caused by reversing direction of winding needle 28 during the winding operation. Alleviating such potential slack is believed to substantially prevent loose windings on the stator and breakage of conductive wire 22.

The above described hysteretic tensioning apparatus reduces tension fluctuation in a conductive wire while coiling the conductive wire. Such apparatus also is believed to be simple to fabricate and utilize.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation. For example, the hysteretic tensioning apparatus described above includes four idler arms. However, the hysteretic tensioning apparatus may include either fewer than four, e.g., one, two, or three, or more than four, e.g., five or six, idler arms. In addition, while the above described hysteretic tensioning apparatus includes three guidance members, such apparatus may include either fewer than three or more than three guidance members. Accordingly, the spirit and scope of the inventions are to be limited only by the terms of the appended claims.

What is claimed is:

1. A hysteretic tensioning apparatus for substantially stabilizing tension in a conductive wire supplied to a winding machine, said apparatus comprising:
a support member;
a brake member mounted to said support member, said brake member rotatable relative to said support member, said brake member is a current controlled brake member and is configured to apply substantially constant tension to the conductive wire during winding; and
a plurality of idler arms pivotally mounted to said support member, said plurality of idler arms configured to engage the conductive wire between a wire source and the winding machine.

2. An apparatus in accordance with claim 1 wherein said brake member is a rotatable disk.

3. An apparatus in accordance with claim 1 wherein at least one of said idler arms is a spring loaded idler arm.

4. An apparatus in accordance with claim 1 comprising four idler arms.

5. An apparatus in accordance with claim 1 wherein at least one of said idler arms comprises a first end and a second end, said first end pivotally coupled to said support member, said second end configured to engage the conductive wire.

6. A method for stabilizing tension in a conductive wire supplied from a wire source to a winding machine, the method employing a hysteretic tensioning apparatus including a support member, at least two idler arms pivotally coupled to the support member and adapted for engaging the conductive wire, and a brake member that is current controlled, said method comprising the steps of:
positioning the hysteretic tensioning apparatus such that the at least two idler arms are between the wire source and the winding machine; and
coupling the conductive wire to the hysteretic tensioning apparatus.

7. A method in accordance with claim 6 further comprising the step of coupling the conductive wire to the winding machine.

8. A method in accordance with claim 6 wherein coupling the conductive wire to the hysteretic tensioning apparatus comprises the step of extending the conductive wire between the current controlled brake member and the two idler arms.

9. A method in accordance with claim 8 further comprising the step of engaging the conductive wire to the brake member.

10. A method in accordance with claim 8 further comprising the step of engaging the conductive wire to at least one of said idler arms.

11. A winding system for winding a wire, said system comprising:
a wire source comprising at least one conductive wire;
a tensioning apparatus comprising a support member, at least two spring loaded idler arms, and a brake member mounted to said support member, said brake member is a current controlled brake member; and
a winding machine, said conductive wire coupled to said tensioning apparatus and extending between said wire source and said winding machine, said at least two idler arms engaging said conductive wire between said wire source and the winding machine.

12. A winding system in accordance with claim 11 wherein said brake member rotatable relative to said support member, said at least two idler arms pivotally coupled to said support member.

13. An apparatus in accordance with claim 12 wherein said brake member is a rotatable disk.

14. An apparatus in accordance with claim 12 comprising four idler arms.

15. An apparatus in accordance with claim 11 wherein each idler arm is pivotally coupled to said support member.

16. An apparatus in accordance with claim 11 wherein each idler arm comprises a first end and a second end, said first end coupled to said support member, said second end configured to engage the conductive wire.

* * * * *